United States Patent
Bender et al.

(10) Patent No.: US 10,904,694 B2
(45) Date of Patent: Jan. 26, 2021

(54) ALERTING AN INDIVIDUAL IN PROXIMITY TO A BORDER

(71) Applicant: INTERNATIONAL BUSINESS MACHINES CORPORATION, Armonk, NY (US)

(72) Inventors: Michael Bender, Rye Brook, NY (US); Shilpa Shetty, Marathahalli (IN); Stan Kevin Daley, Atlanta, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/204,852

(22) Filed: Nov. 29, 2018

(65) Prior Publication Data
US 2020/0178023 A1    Jun. 4, 2020

(51) Int. Cl.
*H04W 4/02* (2018.01)
*H04W 4/021* (2018.01)
*H04W 4/029* (2018.01)

(52) U.S. Cl.
CPC ........... *H04W 4/021* (2013.01); *H04W 4/029* (2018.02)

(58) Field of Classification Search
CPC .. H04W 4/02; H04W 64/00; H04L 29/08657; H04L 29/08108; H04L 29/08936; G01S 5/0252; G01S 5/02; G01S 5/14; H04M 1/72572; G01C 21/20
USPC .................................... 455/456.1–456.3, 577
See application file for complete search history.

(56) References Cited

U.S. PATENT DOCUMENTS

| 5,669,061 | A | * | 9/1997 | Schipper | H04B 7/18541 |
| | | | | | 342/357.64 |
| 9,384,654 | B1 | * | 7/2016 | Chillappa | G06Q 10/08 |
| 2014/0248904 | A1 | * | 9/2014 | Meredith | G01S 5/0252 |
| | | | | | 455/456.1 |
| 2014/0379591 | A1 | * | 12/2014 | Benner | G06Q 50/18 |
| | | | | | 705/311 |
| 2015/0193996 | A1 | * | 7/2015 | Van Wiemeersch | G07C 9/28 |
| | | | | | 340/5.72 |
| 2015/0312467 | A1 | * | 10/2015 | Lee | H04W 68/00 |
| | | | | | 348/211.2 |
| 2017/0026444 | A1 | * | 1/2017 | Bhat | H04L 65/602 |
| 2018/0225429 | A1 | * | 8/2018 | Hough | H04W 4/14 |
| 2020/0272796 | A1 | * | 8/2020 | Ashaari | G06K 19/07758 |

FOREIGN PATENT DOCUMENTS

| CN | 105677720 A | 6/2016 |
| CN | 106373223 A | 2/2017 |
| CN | 105354909 B | 6/2018 |

* cited by examiner

*Primary Examiner* — Dai Phuong
(74) *Attorney, Agent, or Firm* — Law Offices of Ira D. Blecker, P.C.

(57) ABSTRACT

A method in which a user's location with respect to a border is received and if the user is likely to cross the border, a responsive action may be taken automatically and by machine logic. Further, items in the user's possession may be received along with a data set indicating that an item in a first entity is not permitted in a second entity. If it is determined that the user is likely to cross the border with the not permitted item, a notification may be sent to a device of the user that the item is not permitted in the second entity.

18 Claims, 4 Drawing Sheets

ALERTING AN INDIVIDUAL IN PROXIMITY TO A BORDER

BACKGROUND

Geographic tracking of individuals (on foot or in vehicles) is known. For example, some people track their walks or runs using their smart phones and the built in GPS (Global Positioning System) capability that smart phones typically have. As another example, GPS trackers for commercial and personal vehicles are well known and currently deployed on a massive scale.

It is known that items permitted in one geographic location may not be permitted in others. For example, food and drink may be forbidden in a computer lab at a university. As a larger scale example, it is generally not allowed to bring a pet elephant from the state of Nevada into the state of California. In this application, these geographic zones (for example, computer lab room, state, etc.) where different strictures on possessing various types of goods are referred to as "geographic entities," or, more simply, "entities." In this document, "item type" refers to a category of item that is the subject of an entity's stricture on possessions; for example, food, drink and elephants are the "item types" in the above examples. A specific hamburger that a student has purchased at the university cafeteria would be an "item" corresponding to the "item type" of food.

BRIEF SUMMARY

The present exemplary embodiments pertain to alerting one or more individuals who may be approaching an entity or carrying items not permitted in an entity to which the individuals may be traveling. In particular, the individuals' location with respect to the border with the entity is monitored and the individuals are alerted when it appears likely they will be crossing into the entity with the items not permitted by the entity.

Individuals may approach a border which for a variety of reasons the individuals may have no intention to cross. In addition, many entities may have restrictions on carrying items across a border. These restrictions may apply even when declaring the items. Individuals are frequently not aware that they may be about to cross a border or carrying items that may violate the restrictions in the entities. Other restrictions may apply with respect to bringing certain items into a business or public space.

The individuals, not being aware of the border or the restrictions, may end up crossing the border or violating these restrictions causing the individuals inconvenience or loss of the items not permitted in the entity.

The various advantages and purposes of the exemplary embodiments as described above and hereafter are achieved by providing, according to an aspect of the exemplary embodiments, a method comprising: receiving a possessions data set including information indicating that a user is in possession of a first item having a first item type in a first entity; receiving a data set including information that items of the first item type are considered as not permitted in a second entity; receiving an indication that the user is likely to cross a boundary between the first entity and the second entity; and responsive to the indication that the user is likely to cross the boundary, sending, automatically and by machine logic, a notification to a device of the user over a communication network with the notification including information, in human understandable form and format, that the item type of the first item is considered as not permitted in the second entity.

According to another aspect of the exemplary embodiments, there is provided a method comprising: receiving a boundaries data set including data indicative of the geographic locations of boundaries separating a plurality of different entities; receiving a user location data set including data indicative of a current geographic location of a user; determining, automatically and by machine logic that the user is likely to cross a boundary between a first entity, of the plurality of entities, and a second entity, of the plurality of entities, based at least in part upon proximity between the current geographic location of the user and a location of a boundary between the first entity and the second entity indicated in the boundaries data set; and responsive to the determination that the user is likely to cross the boundary, taking, automatically and by machine logic, a responsive action.

According to a further aspect of the exemplary embodiments, there is provided a method comprising: receiving a boundaries data set including data indicative of the geographic locations of boundaries separating a plurality of entities; receiving a user location data set including data indicative of geographic locations of a user as the user moves over time; determining, by machine logic, that the user is likely to cross a boundary between a first entity, of the plurality of entities, and a second entity, of the plurality of entities, based at least in part upon the boundaries data set and the user location data set; and responsive to the determination that the user is likely to cross the boundary, taking, automatically and by machine logic, a responsive action.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION

Figure 1:
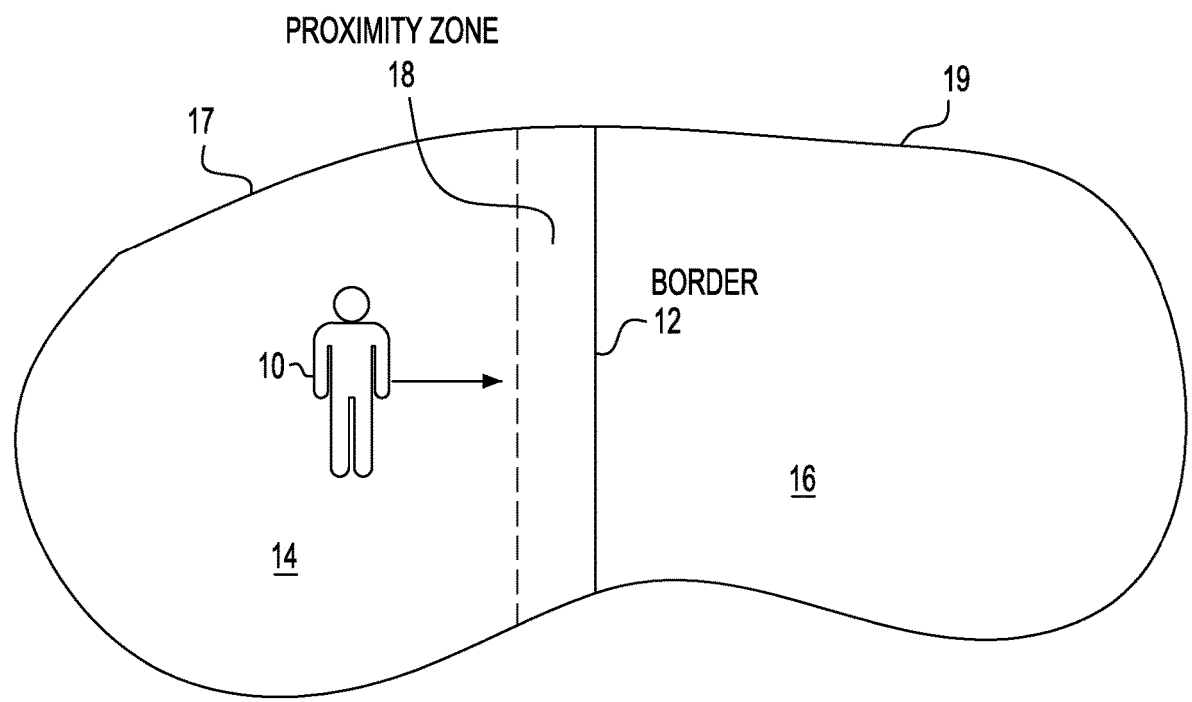
FIG. 1 illustrates a user who may be approaching a border between a first entity and a second entity.

Referring to the Figures in more detail, and particularly referring to FIG. 1, there is illustrated a user 10 who may be approaching a border 12 between a first entity 14 and a second entity 16.

It would be useful to know when the user 10 is likely to cross the border 12 so that a relevant response may be sent to the user 10. For example, the user 10 may be likely to cross a country border so that it may be useful to notify the user 10 that the country border is in proximity so that the user 10 can make sure to have a passport in the user's possession. A proximity zone 18 may be provided to gauge when the user 10 is likely to cross the border 12.

In addition, the user 10 may have an item in the user's possession that may be permitted in the first entity 14 and not permitted in the second entity 16. In this situation, it would be useful to notify the user 10 that the user 10 is about to cross the border 12 so that the user 10 is aware that the item in the user's possession is not permitted in the second entity 16.

As another example, a user may have purchased a peanut butter sandwich and not be aware that the user is approaching a peanut free zone in a school. The user's profile may be set to alert him of school safety zones. As the user approaches the border, i.e., the school safety zone, the user may be alerted of the rule and does not bring the sandwich to an area that could introduce health risks to individuals who may have peanut allergies.

Figure 2:
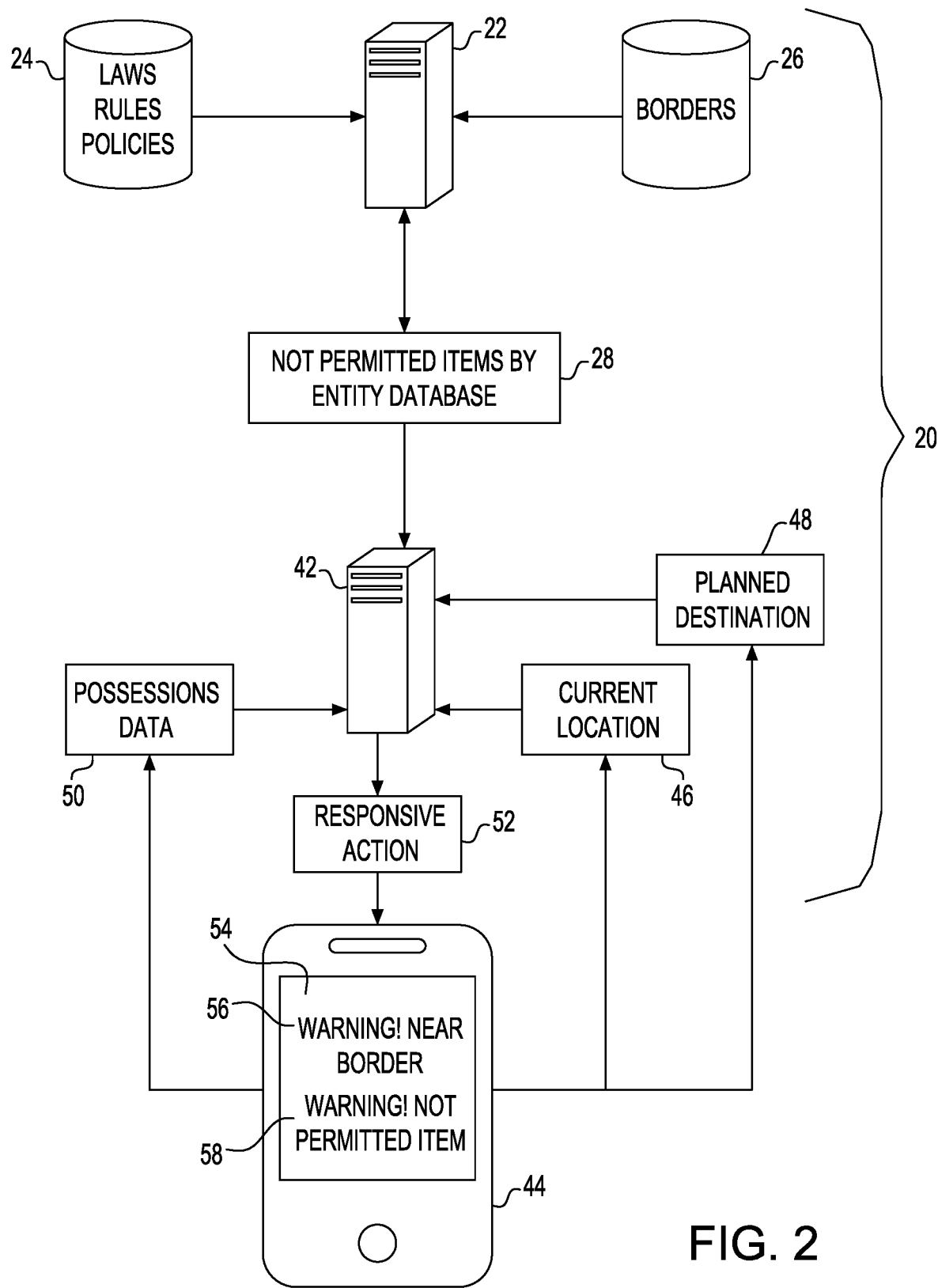
FIG. 2 illustrates a system for implementing the exemplary embodiments.

Referring now to FIG. 2, there is illustrated a system 20 for implementing the exemplary embodiments. The system 20 may include a first computing device 22 which may receive information from a laws, rules and policies database 24 and a borders database 26.

From the laws, rules and policies database 24 and the borders database 26, items not permitted by entity database 28 may be derived.

In one exemplary embodiment, the laws, rules and policies database 24, the borders database 26 and the items not permitted by entity database 28 may be pre-existing. In another exemplary embodiment, it may be preferred to build these databases.

Figure 3:
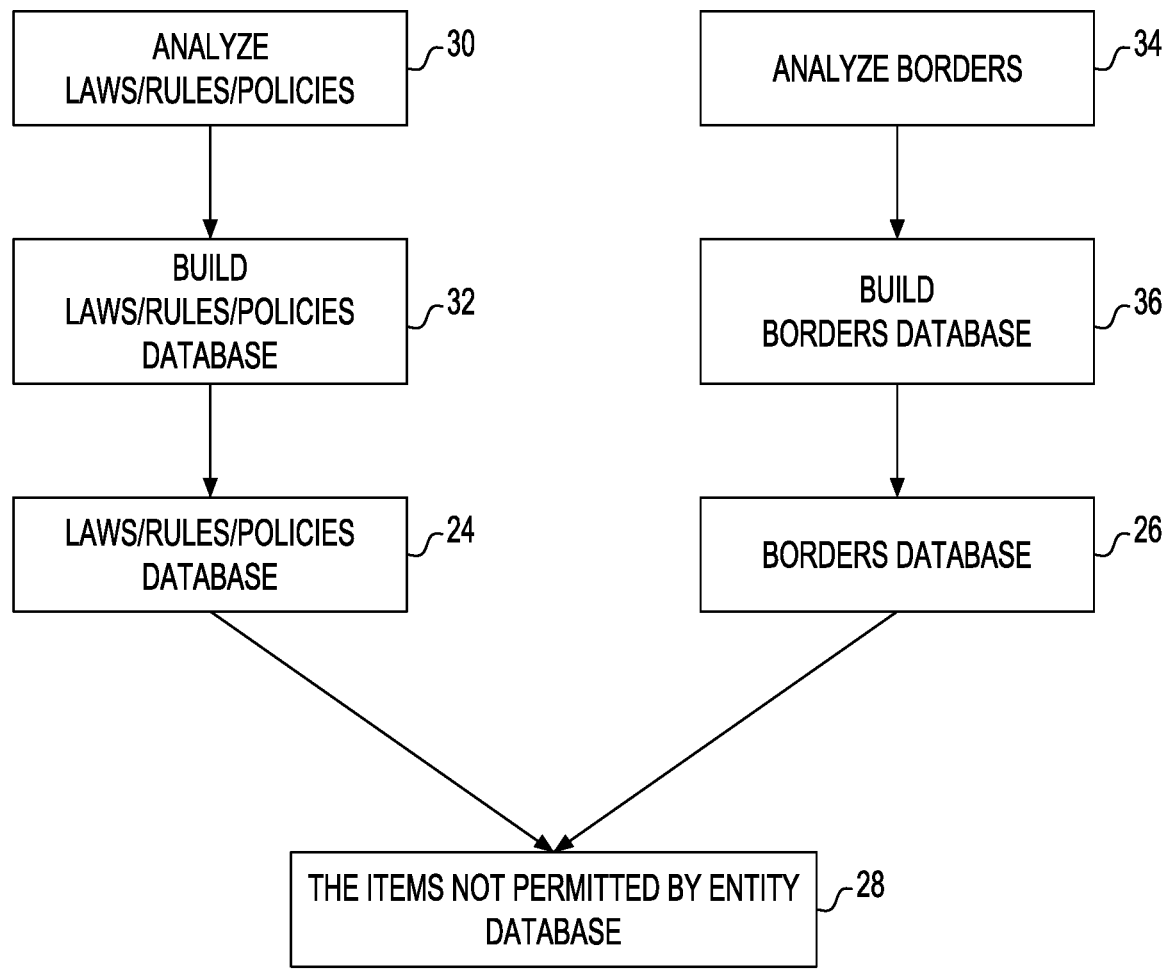
FIG. 3 illustrates the process of making the laws, rules and policies database, the borders database and the items not permitted by entity database.

Referring now to FIG. 3, there is illustrated the process of making the laws, rules and policies database 24, the borders database 26 and the items not permitted by entity database 28 in the preferred exemplary embodiment.

For purposes of the exemplary embodiments, an entity may be a governmental body, a business organization, a religious body or organization, a person or any body or organization that is distinct, independent or self-contained.

The laws, rules and policies database 24 may be made by analyzing laws, rules and policies, box 30. The laws may be laws enacted by a legal entity's legislative body. Rules may be regulations promulgated by a government body to fulfill the purpose of the laws. Policies may be statements promulgated by a government entity regarding the workings of the government entity. Governmental policies may not have the force of laws or regulations. Policies may also be statements promulgated by a business entity regarding the workings of the business entity and may include requirements that may apply to users interfacing with the business entity. After analyzing the laws, rules and policies, a process may build the laws, rules and policies into a database, box 32, resulting in the laws, rules, policies database, box 24.

The borders database 26 may be made by analyzing borders between entities, box 34. These borders may be physical, political, legal or logical. The physical border may be a physical embodiment that separates two entities. For example, a physical border may be a road, river or hill. The political border is a border that a government entity may have made. Such a political border may be, for example, a border between two towns, villages, counties, states or countries. The legal border may be a border dividing entities where behaviors or items on one side of the border are permitted and behaviors or items on the other side of the border are not permitted. The legal border may include, for example, an entity where individuals may drive at 17 years of age whereas individuals must be 18 to drive in a second entity. The logical border may be a border that has been defined to limit or constrain certain activities or items. For example, a logical border may include a circumscribed area on a ship or the area within a shopping center or store where certain items may be permitted or not permitted.

It should be understood that these borders are not mutually exclusive. For example, a physical border may also be a political or legal border. In other examples, a political border may also be a legal or physical border and a legal border may be a logical border.

After analyzing the borders, a process may build the borders into a database, box 36, resulting in the borders database, box 26.

The laws, rules and policies database 24 and the borders database 26 may be queried to build the items not permitted by entity database, box 28. The items not permitted by entity database 28 is a compilation of items that may be not permitted in an entity.

The laws, rules, policies database 24, borders database 26 and not permitted items by entity database 28 may be contained within computing device 22 or may be separate from computing device 22 but accessible by computing device 22 over a communication link such as by WiFi, cellular, satellite or internet.

The not permitted items by entity database 28 may be input to computing device 42. Computing device 42 may also have access to the laws, rules, policies database 24 and the borders database 26, either directly or through computing device 22. It should be understood that computing device 22 and computing device 42 may be the same or different computing devices.

A user may have an application 54 on the user's electronic device 44, shown for example as a smartphone in FIG. 2, but could be other electronic devices such as a laptop, tablet or wireless-enabled wearable technology such as an activity tracker. The application 54 may communicate with system 20. It may be required that the electronic device 44 register with the system 20 to communicate with the system 20. In one exemplary embodiment, the electronic device 44 may automatically register with the system 20 when the application 54 is loaded on the electronic device 44.

It is within the scope of the exemplary embodiments to have the system 20 and application 54 all on the user's electronic device 44. It is further within the scope of the exemplary embodiments to split up the functions of the system 20 and application 54 into three or more electronic devices having communication capabilities such as computing device 22 being a remote electronic device, computing device 28 being on one of the user's electronic devices 44 and the application 54 being on another one of the user's electronic devices 44. It is also within the scope of the exemplary embodiments to have system 20 being remote and application 54 being on one or more of the user's electronic devices 44 (e.g., a smartphone and an activity tracker).

The current geographic location 46 of the electronic device 44 may be obtained from the GPS capability embedded in the electronic device 44 and provided to computing device 42 as an input by the application 54. A user's planned destination 48 may also be obtained from the user's electronic device 44. The application 54 on the electronic device 44 may seek planned destination information from the user's calendar, email and files and provide the planned destination information to the computing device 42. It is also within the scope of the exemplary embodiments for the user to manually input to the application 54 the user's current location 46 and/or the user's planned destination 48.

Knowing the user's current location 46 and the user's planned destination 48, the computing device 42 may determine if the user is likely to cross a border. If the computing device 42 determines that the user is likely to cross a border, the computing device 42 may provide a responsive action 52 to the application 54. The responsive action 52 may be a visual, auditory or haptic responsive. One responsive action 52, for example, may be a message 56 "Warning! You are near a border!".

Possessions data 50 may also be provided to the computing device 42 through application 54. Possessions data 50 may be information about the items that the user may be carrying. Possessions data 50 may be, for example, digital data that the user owns or associates with. Digital data may include, for example, credit card data, calendars, location data from GPS, digital images captured by the user's cameras. Also included may be digitized audio. From this digital data, conclusions may be drawn by application 54, or by application 54 in cooperation with system 20, as to items the user may be carrying. For example, credit card data may be used to find items that the user recently purchased. The user may also manually enter possessions that the user is carrying.

In another exemplary embodiment, the user may opt in to sources of data that the user has no control over such as digital images from surveillance cameras and GPS data.

Knowing the user's possession data 50, the user's current location 46 and the user's planned destination 48, the computing device 42 may determine if the user is likely to cross a border and if the user is carrying certain items. If the computing device 42 determines that the user is likely to cross a border, the computing device 42 may compare the user's possessions data 50 to items in the not permitted items by entity database 28. If the user is carrying items not permitted in the entity over the border, the computing device 42 may provide a responsive action 52 to the application 54. The responsive action 52 may be a visual, auditory or haptic responsive. One responsive action 52, for example, may be a message 58 "Warning! Not permitted item!".

Figure 4:
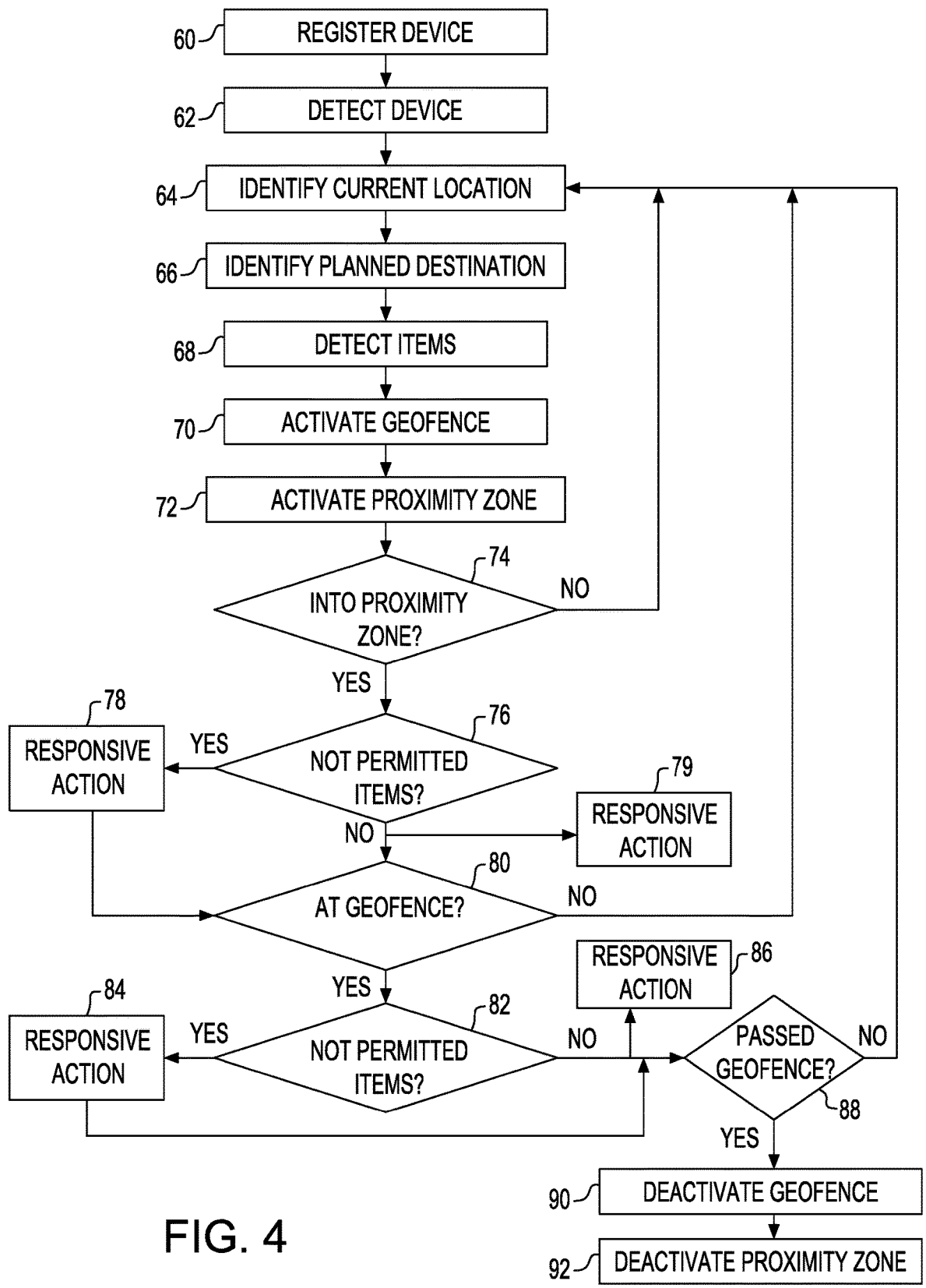
FIG. 4 illustrates a method for implementing the exemplary embodiments.

Referring now to FIG. 4, there is illustrated a method for implementing the exemplary embodiments.

Initially, the user may have to register the user's electronic device 44, box 60, or allow it to be detected, box 62. Loading the application 54 may allow automatic registration of the user's electronic device 44 by system 20.

The current location of the user, more accurately the current location of the user's electronic device 44, may be identified, box 64, through GPS, for example. The user may also voluntarily provide the location of the user's electronic device 44.

By sorting through the digital data such as calendars, credit card receipts and email on the electronic device 44, a planned destination of the user may be identified, box 66.

Items carried by the user may be detected, box 68, by sorting through the user's possessions set 50.

A geofence is desirable to delineate regions and may also indicate borders. A geofence may be a simpler implementation of a border and may be used in place of a border. However, since a geofence is malleable in the sense that it may change with time and objective to fit a particular situation while a border is typically geographically fixed, a border usually may not be used in place of a geofence. In the following explanation of the exemplary embodiment of a method, a geofence is used but it should be understood that where appropriate, a border may be used in place of the geofence.

A geofence is a virtual perimeter for a real-world geographic area such as a city, state or country. A geofence may be dynamically generated—as in a radius around a point location, or a geofence may be a predefined set of boundaries such as school zones or neighborhood boundaries. Referring back to FIG. 1, there may be a geofence 17 that geographically encompasses the first entity 14 and another geofence 19 that geographically encompasses the second entity 16. Between the geofences 17, 19 is border 12. In view of the explanation above of geofences and borders, border 12 may be viewed as a representation of a geofence where geofences 17 and 19 overlap. Geofences are useful because a user's movements, as tracked by the GPS in the user's electronic device 44, can be monitored with respect to the GPS coordinates of the points along the geofence.

Referring back to FIG. 4, in one exemplary embodiment, a geofence may always be activated. In another exemplary embodiment, it may be necessary to activate the geofence, box 70. The geofence may be activated, for example, by application 54 or application 54 in communication with system 20.

A proximity zone is a measure of how close the user is to a boundary. A proximity zone 18 is illustrated in FIG. 1. Proximity zone 18 is an area within the first entity 14 that is close to the border 12. Proximity zone 18 may alternatively be delineated by another geofence that circumscribes the proximity zone 18. In one exemplary embodiment, a proximity zone may always be activated. In another exemplary embodiment, it may be necessary to activate the proximity zone, box 72. The proximity zone may be activated, for example, by application 54 or application 54 in communication with system 20. The user may have the capability through application 54 to vary the size of the proximity zone, that is, the distance from the start of the proximity zone to the border 12.

The user's GPS coordinates may be monitored by the application 54 and reported back to the system 20 such as to computing device 42. The system 20 determines if the user is in the proximity zone, box 74. If the user is not in the proximity zone, the "NO" path is followed to identify the user's current location. If the user is in the proximity zone, the "YES" path is followed to determine if the user has any items that are not permitted in the entity over the border that the user is approaching, box 76.

If it is determined that the user is in possession of the not permitted items and it is likely that the user may cross the border, the "YES" path is followed to have the application 54 send a responsive action, box 78. The system 20 may also monitor if the user is at the geofence, box 80. If the user is not at the geofence, the "NO" path is followed to identify the user's current location, box 64.

Referring back to box 76, if it is determined that the user is not in possession of any of the not permitted items, the "NO" path is followed to determine if the user is at the geofence, box 80, and the "NO" path may be followed to identify the user's current location, box 64, if the user is not at the geofence. A responsive action 79 may also be provided to notify the user that the user is approaching the border represented by the geofence.

If it is determined that the user is at the geofence, box 80, the "YES" path is followed.

It again may be determined if the user is carrying any items that are not permitted in the entity over the border. For example, the user may have purchased some additional items while in the proximity zone. If the user does have such not permitted items and it is likely that the user may cross the border, the "YES" path is followed to provide a responsive action 84. If the user does not have such not permitted items, the "NO" path is followed. Another responsive action 86 may be provided to the user to notify the user that the user is at the border.

It then may be determined if the user has passed the geofence, box 88. If the user has not passed the geofence, the "NO" path is followed to identify the user's current location, box 64. If the user has passed the geofence, meaning the user has crossed the border into the next entity, the "YES" path is followed and the geofence may be deactivated, box 90, if necessary and the proximity zone may be deactivated, box 92, if necessary. The geofence and proximity zone may be deactivated, for example, by application 54 or application 54 in communication with system 20.

In the method described with respect to FIG. 4, it may be possible that while a user is in the proximity zone or at the border, the user may have no intention to actually cross the border. The user may also be carrying items not permitted in the entity on the other side of the border. If there are no indicia, such as residence information, hotel reservations, calendar entries, emails, appointments, etc., indicating that the user is unlikely to cross the border, in one exemplary embodiment, it may be assumed that when the user is within the proximity zone, the user is likely to cross the border. In other words, if the user does not have a reason to be in the proximity zone, it is assumed the user is likely to cross the border. If the system wrongly evaluates the user as likely to cross the border, such an evaluation may be a false positive and any responsive action provided to the user may be unnecessary In one exemplary embodiment, the false positives experienced by the user may be mitigated by putting in a learning loop in system 20 that may supplement the other indicia of the user's likely travel. As an example, if the user's purchase history and/or calendar shows that the user may cross a boundary that the user normally just gets close to, then the user is alerted. However, if the system has learned that you get close to a particular boundary frequently, then the user may not be warned, eliminating a false positive.

In another exemplary embodiment to mitigate false positives, the system 20 may be designed so that the user is not registered for every possible border crossing that the user could possibly come across. The user may select through application 54 warning areas from a plurality of available ones based on the user's personal desire to be warned.

In another exemplary embodiment to mitigate false positives, if the user has gone a specific distance from when the user originally selected warning areas, the user may be asked again to select warning areas and the user may be presented new warning areas and optionally highlighting warning areas that are similar to ones the user may have previously selected.

It should be understood that FIG. 4 contains variations of the exemplary embodiments and not all steps shown in FIG. 4 are in all exemplary embodiments. Following are some preferred exemplary embodiments.

One exemplary embodiment pertains to a method. In the method a possessions data set is received as provided for in box 68 of FIG. 4. The possessions data set may be the possessions data illustrated in FIG. 2. The possessions data set may be information indicating that a user is in possession of a first item having a first item type in a first entity.

A data set is received including information that items of the first item type are considered as not permitted in a second entity. System 20 through the not permitted items by entity database 28 may provide the information that items are not permitted in the second entity. As shown in FIG. 4, the items carried by user are determined if they are not permitted in the second entity, box 76 and box 82.

An indication may be received that the user is likely to cross a boundary between the first entity and the second entity. FIG. 4 illustrates that the user is monitored to determine if the user is in the proximity zone, box 74, and/or at the geofence, box 80, and thus likely to cross the boundary into the second entity. As described previously, if there is no indicia indicating that the user has a reason to be in the proximity zone or at the geofence, then it may be assumed that the user is likely to cross the border.

Responsive to the indication that the user is likely to cross the boundary, sending, automatically and by machine logic, a notification to a device of the user over a communication network with the notification including information, in human understandable form and format, that the item type of the first item is considered as not permitted in the second entity. While the user is in the proximity zone, box 74, a responsive action, box 78, may be sent to the user to indicate that the user has not permitted items. In addition, or instead of, the proximity zone, it may be determined that the user is at the geofence, box 82, and a responsive action, box 84, may be sent to the user to indicate that the user has not permitted items.

One exemplary embodiment pertains to another method. In the method, a boundaries data set is received including data indicative of the geographic locations of boundaries separating a plurality of different entities. The boundaries data set may be the borders database 26 referenced in FIG. 2 which may be used to determine the proximity zone, box 74, and geofence, box 80, in FIG. 4.

A user location data set is received including data indicative of a current geographic location of a user. The location data set may be the current location of the user as provided by the GPS in the user's electronic device 44. The user location data set may be used to identify the current location of the user, box 64.

It is determined, automatically and by machine logic that the user is likely to cross a boundary between a first entity, of the plurality of entities, and a second entity, of the plurality of entities, based at least in part upon proximity between the current geographic location of the user and a location of a boundary between the first entity and the second entity indicated in the boundaries data set. As illustrated in FIG. 4, it may be determined if the user is in the proximity zone, box 74. As described previously, if there is no indicia indicating that the user has a reason to be in the proximity zone, then it may be assumed that the user is likely to cross the boundary.

Responsive to the determination that the user is likely to cross the boundary, taking, automatically and by machine logic, a responsive action. The responsive action may be the responsive action, box 79, or responsive action, box 86, illustrated in FIG. 4.

One exemplary embodiment pertains to a further method. In the method, a boundaries data set is received including data indicative of the geographic locations of boundaries separating a plurality of entities. The boundaries data set is the borders database 26 referenced in FIG. 2 which may be used to determine the proximity zone, box 74, and geofence, box 80, in FIG. 4.

A user location data set is received including data indicative of geographic locations of a user as the user moves over time. The location data set may be the current location of the user as provided by the GPS in the user's electronic device 44. The user location data set may be used to identify the current location of the user, box 64.

It is determined, by machine logic, that the user is likely to cross a boundary between a first entity, of the plurality of entities, and a second entity, of the plurality of entities, based at least in part upon the boundaries data set and the user location data set. The system in FIG. 2 may use the borders database 26 and the current location 46 of the user to make the determination that the user is likely to cross the border. As described previously, if there is no indicia indicating that the user has a reason to be in the proximity zone or at the boundary, then it may be assumed that the user is likely to cross the boundary.

Responsive to the determination that the user is likely to cross the boundary, taking, automatically and by machine logic, a responsive action. The responsive action may be the responsive action, box 79, or responsive action, box 86, illustrated in FIG. 4.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A method comprising:
    detecting a user's computing device, the user's computing device having an application to communicate with a system that has digital data pertaining to the user such that at least some of the digital data is associated with the user but not with the user's computing device, the application drawing conclusions from this digital data as to items a user may be carrying;
    responsive to detecting the user's computing device:
        communicating by the application with the system to draw conclusions about items in possession by the user, the sum of the items in possession by the user being a possessions data set;
        receiving the possessions data set including information indicating that the user is in possession of a first item having a first item type in a first entity wherein the user's computing device is not the first item;
        receiving a data set including information that items of the first item type are considered as not permitted in a second entity;
        receiving an indication that the user is likely to cross a boundary between the first entity and the second entity; and
        responsive to the indication that the user is likely to cross the boundary, sending, automatically and by machine logic, a notification to a device of the user over a communication network with the notification including information, in human understandable form and format, that the item type of the first item is considered as not permitted in the second entity.

2. The method of claim 1 wherein the possessions data set comprises digital information on a user's electronic device.

3. The method of claim 2 wherein the possessions data further comprises digitized data and digitized audio associated with the user.

4. The method of claim 1 wherein the first entity and the second entity are legal jurisdictions and the boundary is a physical, political or legal border.

5. The method of claim 1 further comprising defining a proximity zone proximate to the boundary by a geofence where the geofence is a virtual perimeter for the proximity zone and wherein receiving an indication that the user is likely to cross the boundary comprises entering the proximity zone proximate to the boundary.

6. The method of claim 1 wherein the data set including information that items of the first item type are considered as not permitted in a second entity is a legal data set comprising laws, rules and policies.

7. The method of claim 1 wherein one of the first and second entities is a business and the data set including information that items of the first item type are considered as not permitted in the second entity is a policy data set comprising policies pertaining to the at least one of the first and second entities.

8. The method of claim 7 wherein the boundary is a logical boundary.

9. The method of claim 1 further comprising receiving a boundaries data set including data indicative of the geographic locations of boundaries separating a plurality of different entities including the boundary between the first entity and the second entity; and wherein receiving an indication that the user is likely to cross the boundary between the first entity and the second entity is based at least in part upon the location of the boundary in the boundaries data set.

10. The method of claim 1 further comprising receiving a boundaries data set including data indicative of the geographic locations of boundaries separating a plurality of different entities including the boundary between the first entity and the second entity; and receiving a user location data set including data indicative of geographic locations of the user as the user moves over time; and wherein determining that the user is likely to cross the boundary between the first entity and the second entity is based at least in part upon the location of the boundary in the boundaries data set and the user location data set.

11. A method comprising:
    detecting a user's computing device, the user's computing device having an application to communicate with a system that has digital data pertaining to the user such that at least some of the digital data is associated with the user but not with the user's computing device, the application drawing conclusions from this digital data as to items in possession by the user;
    responsive to detecting the user's computing device:
        communicating by the application with the system to draw conclusions about items in possession by the user, such items in possession by the user not including the user's computing device;
        receiving a boundaries data set including data indicative of the geographic locations of boundaries separating a plurality of different entities;
        receiving a user location data set including data indicative of a current geographic location of a user;
        defining a proximity zone proximate to the boundary by a geofence where the geofence is a virtual perimeter for the proximity zone
        determining, automatically and by machine logic that the user is likely to cross a boundary between a first entity, of the plurality of entities, and a second entity, of the plurality of entities, based at least in part upon proximity between the current geographic location of the user and a location of a boundary between the first entity and the second entity indicated in the boundaries data set, wherein the proximity between the current geographic location of the user and the location of the boundary is the proximity zone proximate to the boundary; and
        responsive to the determination that the user is likely to cross the boundary, notifying to the user's computing device, automatically and by machine logic, that the user has items in possession by the user permitted in the first entity but not permitted in the second entity.

12. The method of claim 11 wherein the first entity and the second entity are legal jurisdictions and the boundary is a physical, political or legal border.

13. The method of claim 11 wherein one of the first and second entities is a business and the boundary is a physical, legal or logical border between the business and the other of the first and second entities.

14. The method of claim 11 wherein the responsive action is a notification to a device of the user over a communication network with the notification including information, in human understandable form and format, that the user is likely to cross the boundary.

15. A method comprising:
- detecting a user's computing device, the user's computing device having an application to communicate with a system that has digital data pertaining to the user such that at least some of the digital data is associated with the user but not with the user's computing device, the application drawing conclusions from this digital data as to items in possession by the user;
- responsive to detecting the user's computing device:
  - communicating by the application with the system to draw conclusions about items in possession by the user, such items in possession by the user not including the user's computing device;
  - receiving a boundaries data set including data indicative of the geographic locations of boundaries separating a plurality of entities;
  - receiving a user location data set including data indicative of geographic locations of a user as the user moves over time;
  - defining a proximity zone proximate to the boundary by a geofence where the geofence is a virtual perimeter for the proximity zone
  - determining, by machine logic, that the user is likely to cross a boundary between a first entity, of the plurality of entities, and a second entity, of the plurality of entities, based at least in part upon the boundaries data set and the user location data set, wherein determining that the user is likely to cross the boundary comprises entering the proximity zone proximate to the boundary; and
  - responsive to the determination that the user is likely to cross the boundary, notifying to the user's computing device, automatically and by machine logic, that the user has items in possession by the user permitted in the first entity but not permitted in the second entity.

16. The method of claim 15 wherein the first entity and the second entity are legal jurisdictions and the boundary is a physical, political or legal border.

17. The method of claim 15 wherein one of the first and second entities is a business and the boundary is a physical, legal or logical border between the business and the other of the first and second entities.

18. The method of claim 15 wherein the responsive action is a notification to a device of the user over a communication network with the notification including information, in human understandable form and format, that the user is likely to cross the boundary.

* * * * *